A. USTERUD.
WRITING GLOVE.
APPLICATION FILED APR. 17, 1916.
1,247,183.
Patented Nov. 20, 1917.
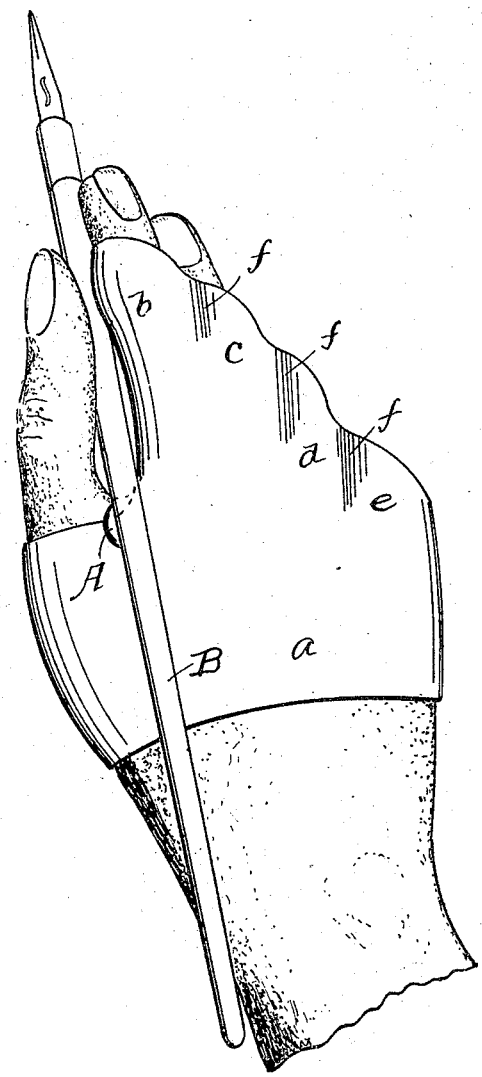
Inventor,
Anders Usterud,
By [signature]
Atty.

UNITED STATES PATENT OFFICE.

ANDERS USTERUD, OF SKIEN, NORWAY.

WRITING-GLOVE.

1,247,183. Specification of Letters Patent. Patented Nov. 20, 1917.

Application filed April 17, 1916. Serial No. 91,694.

*To all whom it may concern:*

Be it known that I, ANDERS USTERUD, a subject of the King of Norway, residing at Skien, Norway, have invented certain new and useful Improvements in Writing-Gloves; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to a writing glove which is especially adapted for use in writing lessons and has for its object to enforce a correct position of the fingers. For this purpose the glove is made of stiff material shaped to suit the position which the hand should taken when writing.

In the accompanying drawing the figure is a top plan view of my improved glove applied to the hand grasping a pen and held in position for writing.

The glove has a body portion $a$ which surrounds the back and palm of the hand back of the thumb, leaving the latter free beyond the second joint.

The finger portion $b$ extends forward so as to surround the first or index finger to a point beyond the first joint.

The other fingers portions $c$, $d$, $e$, of the glove are progressively shortened so as to leave the little finger almost entirely uncovered. The glove fingers need not be entirely severed, but may be provided instead with impressions $f$, fitting between the fingers. The glove may be fastened around the wrist or may be made shorter so as to extend on a part only of the back of the hand without being fastened.

The glove is preferably made of celluloid or similar relatively rigid material, or it may be made also of elastic material such as india rubber or the like. When made of rigid material the finger portion $b$ will, of course, form a rigid support for the index finger and prevent the latter from being drawn out of the correct writing position. But, when the glove is made of elastic material, the normal position of said portion $b$ will be that of the correct writing position and will act as a yielding support for the finger having a tendency to draw it into the correct position when moved therefrom. The glove may be provided at the base of the index finger with an abutment A for the penholder B.

I claim:

1. A writing glove comprising a body portion for surrounding the hand behind the fingers, and a finger portion surrounding the index finger beyond the joints thereof and adapted to maintain it in a predetermined position, said finger portion being progressively shortened toward the little finger portion of the glove, and an abutment on the body portion adjacent the base of the index finger.

2. A writing glove of rigid material comprising a body portion for surrounding the hand beyond the knuckles and second joint of the thumb, and a finger portion surrounding the index finger beyond the joints thereof and adapted to maintain it in a predetermined position, said finger portion being progressively shortened toward the little finger portion of the glove, and an abutment on the body portion adjacent the base of the index finger.

In testimony that I claim the foregoing as my invention, I have signed my name in presence of two subscribing witnesses.

ANDERS USTERUD.

Witnesses:
THS. BERG,
M. RISER.